United States Patent [19]

Rayit

[11] Patent Number: 4,992,122
[45] Date of Patent: Feb. 12, 1991

[54] METHOD OF COUPLING SINGLE-MODE OPTICAL FIBERS TO FORM A COUPLER

[75] Inventor: Narinderjeet S. Rayit, Hayes, England

[73] Assignee: Telephone Cables Limited, England

[21] Appl. No.: 258,577

[22] Filed: Oct. 17, 1988

[30] Foreign Application Priority Data

Oct. 23, 1987 [GB] United Kingdom ............... 8724893

[51] Int. Cl.⁵ .............................................. B32B 17/04
[52] U.S. Cl. .................................... 156/158; 156/256; 156/296; 350/96.15; 350/96.21
[58] Field of Search ....................... 156/158, 296, 256; 65/4.2; 350/96.15, 96.21, 96.22, 96.23

[56] References Cited

U.S. PATENT DOCUMENTS

| | | | |
|---|---|---|---|
| 3,902,786 | 9/1975 | Brown | 350/96.21 |
| 4,134,640 | 1/1979 | Auracher et al. | 350/96.15 |
| 4,402,568 | 9/1983 | Kulich et al. | 350/96.15 |
| 4,465,335 | 8/1984 | Eppes | 350/96.21 |
| 4,784,452 | 11/1988 | Hodge et al. | 350/96.15 |
| 4,822,127 | 4/1989 | Kamiya et al. | 350/96.15 |

Primary Examiner—Caleb Weston
Attorney, Agent, or Firm—Kirschstein, Ottinger, Israel & Schiffmiller

[57] ABSTRACT

A coupler for at least two optical fibres in which at least one port is redundant, e.g. a 1×2 or a 1×3 coupler, is formed by first terminating the fibre end which is to form that redundant port, and then coupling the fibres e.g. by fusion.

4 Claims, 1 Drawing Sheet

METHOD OF COUPLING SINGLE-MODE OPTICAL FIBERS TO FORM A COUPLER

BACKGROUND OF THE INVENTION

1. Field of the Invention

This invention relates to optical fibre couplers.

2. Description of Related Art

Optical fibre couplers may be constructed so that there are at least two uni-directional ports (one carrying incoming light, one other carrying outgoing light), one bidirectional port and at least one unused port which is terminated. If the bidirectional port is also terminated, the isolation of the coupler may be measured between the unidirectional ports.

In certain optical fibre applications, the isolation is required to be high; this isolation is governed by reflections at the unused port or ports. Whilst each port can be terminated to reduce reflections using a matching refractive index medium placed outside the coupler, it is preferable that each termination is inside the coupler.

Thus the unused port of a 2×2 coupler may be terminated to form a 1×2 coupler. Similarly 1×3 and 1×4 couplers may be formed by terminating all but one of the constituent fibres.

It is known to reduce reflections by terminating the unused port outside the coupler by embedding a tapered end of the respective fibre in a matching refractive index medium.

However, the tapering of the fibre after the coupler is formed has been found to weaken or alter the performance of the coupler.

SUMMARY OF THE INVENTION

The invention provides a method of coupling at least two optical fibres, comprising the steps of first terminating at least one of the fibres and then coupling the optical fibres such that the or each terminated fibre forms a redundant port of the resulting coupler.

Preferably, the end or ends of all but one of the optical fibres is or are first terminated with a tapered termination, and the fibres are then coupled by bonding the non-terminated fibre to the terminated fibre or fibres at or adjacent that end or those ends and by forming a biconical coupling between the fibres at a region spaced a short distance from the tapered termination or terminations.

Conveniently, the method comprises, after the bonding of the non-terminated fibre to the terminated fibre or fibres, applying a controlled tension to the fibres as the biconical coupling is formed.

Preferably the fibres are then embedded in a refractive index matching material, such as a silicone resin, over the coupling region and the tapered termination or terminations to complete the fabrication of the coupler.

The invention is particularly applicable to single-mode couplers.

The coupling may be formed in the usual way, by twisting the fibres together and heating the twisted region to cause them to fuse together, at the save time applying a controlled tension to the fibres to produce a predetermined stretching. The bonding of the tapered termination of said one fibre to the other fibre, for example by an epoxy resin adhesive, facilitates the stretching of said one fibre.

BRIEF DESCRIPTION OF THE DRAWINGS

One method of forming a coupler in accordance with the invention will be described by way of example with reference to the accompanying drawings in which.

DETAILED DESCRIPTION OF THE PREFERRED EMBODIMENT

Figure 1:
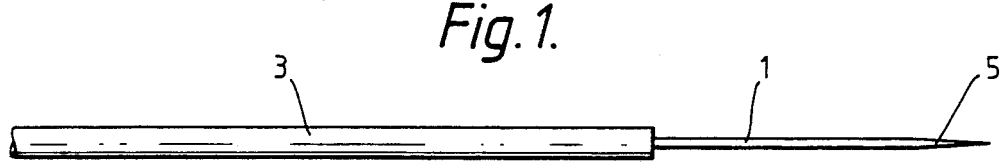
FIG. 1 shows one end of an optical fibre tapered to form a termination.

As shown in FIG. 1, the end 5 of a 2 m single mode optical fibre 1 is stripped of about 35 mm of its primary coating 3 and is then cleaned. A small micro-flame (2 mm in diameter and 3 mm long) is used to terminate the end 5 of the fibre to form a taper some 2–3 mm in length.

Figure 2:
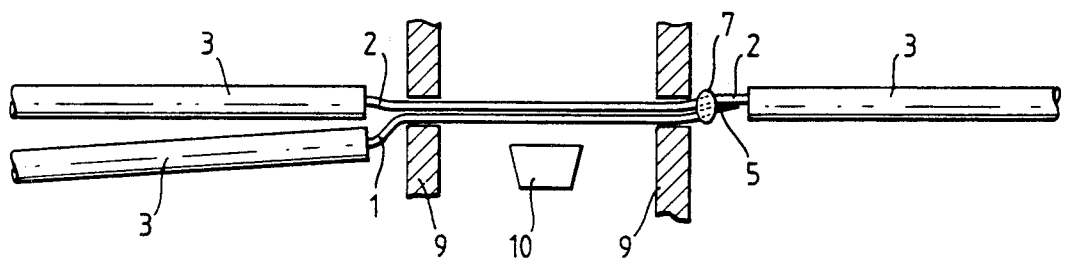
FIG. 2 shows two optical fibres, one of which is terminated at one end, in a coupler fabrication rig.
Figure 3:
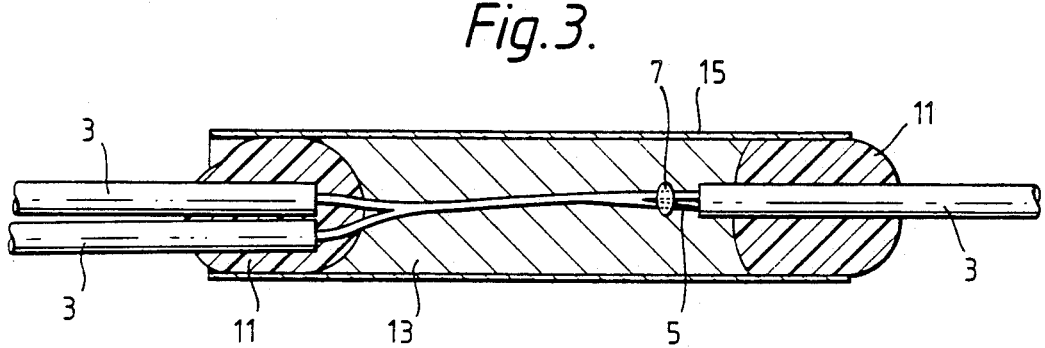
FIG. 3 shows the encapsulated coupler.

The middle of a further fibre 2 is stripped to expose around 35 mm of bare fibre. The fibres 1, 2 are then located in slots 9 on a coupler fabrication rig, (FIG. 2). Using an epoxy adhesive 7 tapered end 5 of the terminated fibre 1 is fixed to the stripped part of the further fibre 2. Subsequently, a conventional biconical fused coupler is fabricated using an oxygen-butane torch 10.

The tapered end 5 of the terminated fibre and the region where the biconical coupling is formed are encapsulated in silicone resin 13. This is achieved by placing the coupler on a glass substrate 15 and securing it thereto using epoxy adhesive 11. Silicone resin 13 is then poured over the 1×2 coupler and is cured.

Similar methods may be used to form 1×3 and 1×4 couplers.

The method of termination permits a very compact high insolation coupler to be formed.

I claim:

1. A method of coupling at least two single-mode optical fibres to form a coupler, comprising the steps of: initially terminating an end of at least one of the fibres with a tapered termination; thereupon, bonding the terminated end of said at least one fibre to the other fibre which is not terminated; and applying a controlled tension to the fibres and fusing the tensioned fibres together at a coupling region spaced away from the tapered termination to form a biconical coupling between the fused fibres, said at least one terminated fibre forming a redundant unused port inside the coupler.

2. A method according to claim 1, and further comprising the steps of twisting the fibres together at the coupling region, heating the twisted fibres and, at the same time, performing the tension-applying step to produce a pre-determined stretching of the twisted fibres and to cause the latter to fuse together at the coupling region.

3. A method of coupling a plurality of single-mode optical fibres to form a coupler, comprising the steps of: initially terminating each end of all but one of the fibres with a tapered termination; thereupon, bonding the end of each of the terminated fibres to said one non-terminated fibre; and applying a controller tension to and fusing each of the terminated fibres to the non-terminated fibre at a coupling region spaced away from the tapered terminations to form a biconical coupling, each terminated fibre forming a redundant unused port inside the coupler.

4. A method according to claim 3, and further comprising the step of embedding the biconically coupled fibres in a refractive index-matching material over the coupling region and each tapered termination to complete the coupler.

* * * * *